INVENTORS.
HAROLD F. KRUZAN
HEINZ K. HETZ
BY Lyon + Lyon
ATTORNEYS

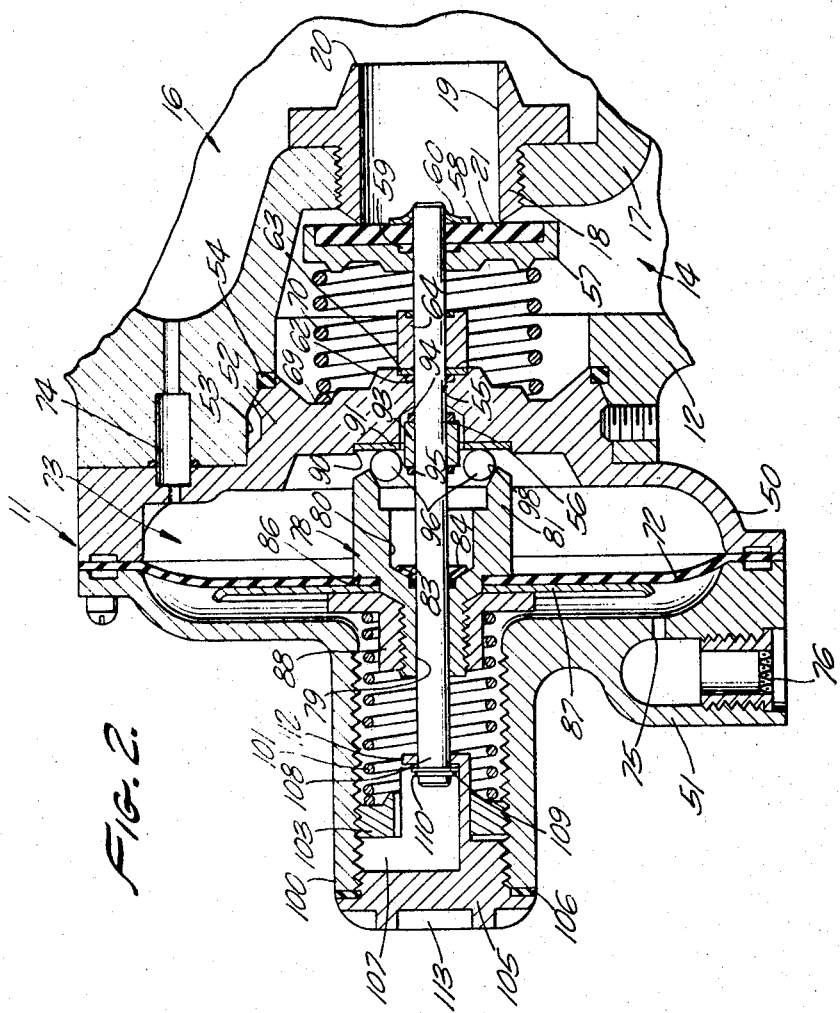

United States Patent Office 3,424,194
Patented Jan. 28, 1969

3,424,194
OVERPRESSURE SHUTOFF DEVICE
Harold F. Kruzan, Yorba Linda, Calif., and Heinz K. Hetz, Doylestown, Pa., assignors, by mesne assignments, to American Meter Company, Philadelphia, Pa., a corporation of Delaware
Filed July 26, 1966, Ser. No. 567,882
U.S. Cl. 137—461                                    12 Claims
Int. Cl. F16k 17/02

ABSTRACT OF THE DISCLOSURE

An overpressure shutoff device for use with a gas pressure regulator. A normally reset closure member is provided which allows gas flow. When an abnormal pressure condition occurs, the shut off device trips allowing the closure member to terminate gas flow. The closure member is coupled with a shaft coaxially mounted with respect to a tripping mechanism which includes a ball cage and a plurality of balls. A plug is provided for engaging the shaft for facilitating resetting of the closure member and tripping mechanism as the plug is unscrewed from the housing of the device.

---

Figure 1:
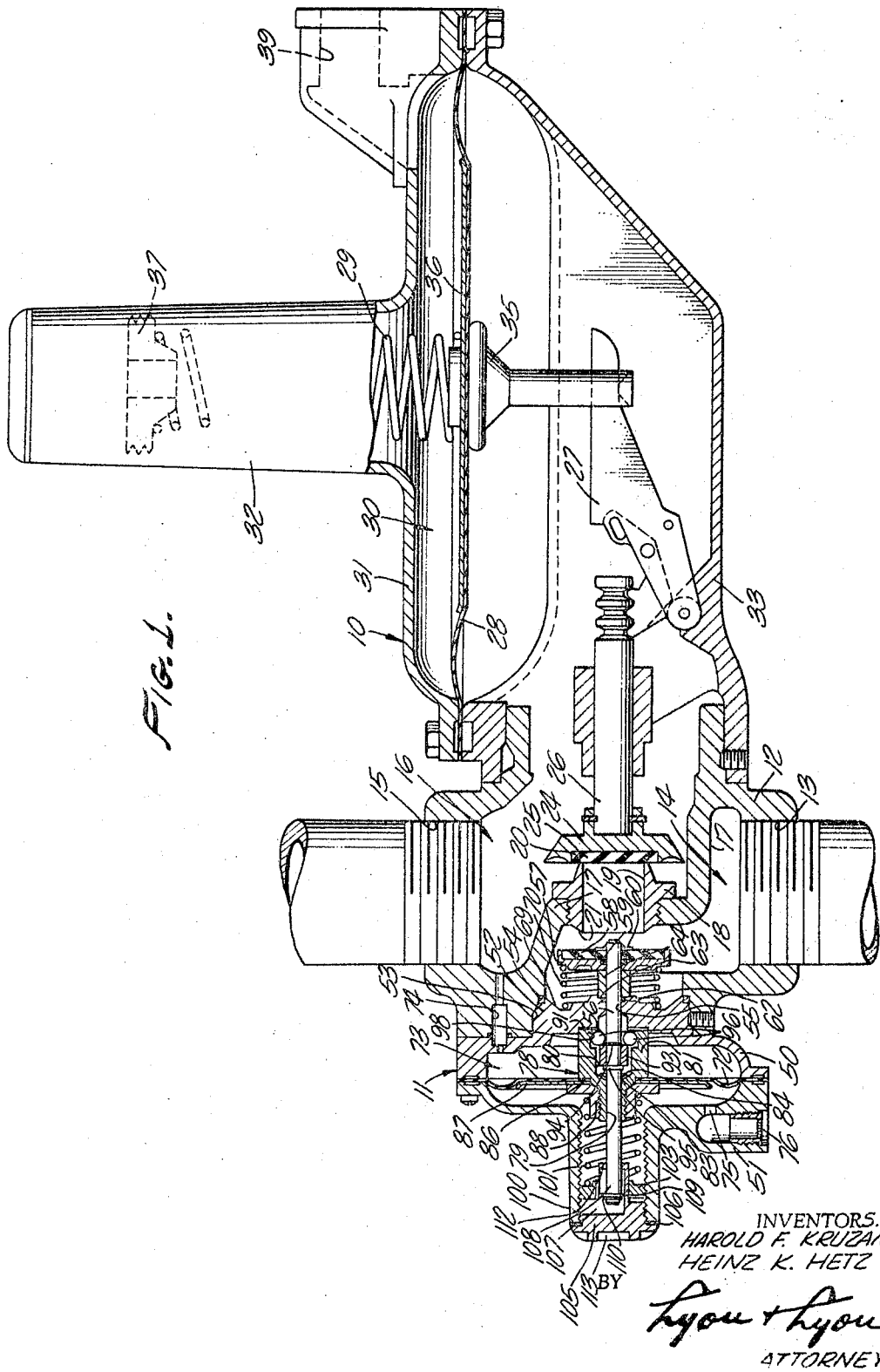

This invention relates to regulators and more particularly to an overpressure shutoff device for use with gas regulators.

Typical gas pressure regulators include an inlet and outlet having a valve disposed therebetween for regulating gas pressure at the outlet. The valve generally is connected to one or more pressure sensing diaphragms, the movement of which operates the valve. In certain applications, it is desirable to close the valve or otherwise terminate gas flow from the inlet to the outlet upon the occurrence of an overpressure condition at the outlet or at a particular point downstream thereof.

Accordingly, it is an object of the present invention to provide an improved overpressure shutoff device for use with a regulator.

It is an additional object of this invention to provide an improved overpressure shutoff device for use with gas regulators and which is relatively compact and reliable in operation.

A further object of this invention is to provide an improved compact and sensitive overpressure shutoff device for gas pressure regulators.

Another object of this invention is to provide an improved overpressure shutoff device for use with gas regulators which may be reset with relative ease.

These and other objects and features of this invention will become more apparent through a consideration of the following description taken in conjunction with the drawing in which:

FIGURE 1 is a cross sectional view of a gas pressure regulator and an overpressure shutoff device according to the invention coupled therewith; and FIGURE 2 is a partial cross sectional view of the overpressure shutoff device in a tripped position.

Briefly, in accordance with the concepts of the present invention an overpressure shutoff device for use with a gas pressure regulator is provided. The device includes a normally cocked or reset closure member which allows gas to flow and be controlled by the regulator in a conventional manner. When an abnormal or overpressure condition occurs at the regulator outlet or downstream therefrom, the shutoff device trips allowing the closure member to terminate gas flow through the regulator. The closure member is coupled with a shaft coaxially mounted with respect to a tripping mechanism which includes a ball cage and a plurality of balls. The tripping mechanism is released by the action of a predetermined pressure on a diaphragm which moves in one direction to allow the closure member to move in an opposite direction. Means also are provided for facilitating resetting of the closure member and tripping mechanism.

Turning now to the drawing, a pressure regulator 10 is shown having an overpressure shutoff device 11 according to the present invention attached thereto. The regulator assembly 10 includes a valve body 12 having a threaded inlet 13 communicating with an inlet chamber 14 and a threaded outlet 15 communicating with an outlet chamber 16. A wall 17 separates the inlet and outlet chambers, and the wall has a bore with an insert 18 threaded therein. The insert 18 has an orifice 19 therethrough providing a regulator valve seat 20 and an overpressure valve seat 21.

A valve closure member 24 having a resilient disk 25 for providing a seal with the seat 20 is attached to a valve stem 26 which in turn is operated through a linkage arrangement 27 from a diaphragm 28 and spring 29. A diaphragm chamber 30 is formed by an upper housing member 31 having an upstanding tubular spring housing 32, and a lower housing member 33 which is coupled with the valve housing 12. The periphery of the diaphragm 28 is sealed between the outer flanges of the housing members 31 and 33 and divides the diaphragm chamber 30. A coupling 35 is secured to the center of the diaphragm 28 which is backed by a diaphragm plate 36. The spring 29 exerts a downward bias on the diaphragm 28 as determined by the position of a threaded spring seat member 37. The coupling 35 is coupled through the linkage 27 to move the valve stem 26. The upper portion of the chamber 30 is vented to the atmosphere through a passageway 39. As will be apparent to those skilled in the art, the outlet pressure communicates with the underside of the diaphragm 28 and the pressure differential across the diaphragm, including the force provided by the spring 29, controls the operation of the valve closure member 24.

According to the concepts of the present invention, the the overpressure shutoff assembly 11 functions in response to an overpressure condition in the outlet chamber 16, or at a desired location downstream therefrom, to close the orifice 19 through the pressure regulator valve. The overpressure shutoff device 11 includes a body assembly 50 and a top assembly 51. The right end 52 of the body assembly 50 is circular and fits within a bore 53 in the valve body 12. A seal is provided by an O-ring 54. The end 52 has a bore 55 therein through which a valve shaft 56 extends. A seat disk unit 57 having a resilient disk 58 for seating with the valve seat 21 is coupled to the end of the shaft 56 by a retainer ring 59 and push nut 60. An O-ring 62 provides a seal about the right end of the shaft 56, and this ring is retained in position by a retainer ring 63. A spacer 64 is mounted on the shaft 56 between the retainer ring 63 and the back face of the seat disk unit 57. An annular groove 69 is provided on the end 52 of the body assembly 50, and a shutoff spring 70 has one end positioned therein to urge the seat disk unit 57 toward the valve seat 21 (to the right as shown in FIGURE 1).

A diaphragm 72 has its peripheral edge mounted between the body and top assemblies 50 and 51 and defines a pressure chamber 73 on each side thereof. The right side of the diaphragm 72 as shown in FIGURE 1 is responsive to regulator outlet pressure through a passageway 74, and the left side thereof is vented to the atmosphere through a passageway 75 and a vent screen 76. If desired, the passageway 74 may be closed and the right side of the diaphragm chamber 73 coupled at any desired location with an outlet supply pipe (not shown) downstream of the outlet chamber 16.

A latching mechanism includes a ball cage 78 which essentially is cup shaped. The cage 78 has a bore 79 through which the shaft 56 extends and an enlarged bore 80 which defines a skirt 81 and an annular space between the shaft and skirt 81. An O-ring 83 and retaining washer 84 are provided in the ball cage 78 at the interface of the bores 79 and 80 to provide a seal with the periphery of the shaft 56. However, the shaft and ball cage are relatively movable with respect to each other.

The center of the diaphragm 72 is positioned on the left end of the ball cage 78 against a shoulder 86, and the diaphragm is retained by a diaphragm plate 87 and diaphragm nut 88 threaded onto the end of the ball cage 78. A stepped bore 90 is provided in the end 52 of the body assembly 50, and a ball plate or washer 91 is positioned therein. A collar 93 is secured to the shaft 56 by retainer rings 94 and 95, but the collar may be an integral part of the shaft if desired. A plurality of, for example six but fewer may be used for small overpressure devices, of the balls 96 are positioned about the shaft 56 in the annular space defined by the shaft 56 and the skirt 81 of the ball cage 78. As will be discussed in greater detail subsequently, the sealing disk unit 57 is maintained in a normally open or reset position as shown in FIGURE 1 by the latching mechanism formed by the ball cage 78, collar 93 and balls 96. When the diaphragm 72 moves to the left as shown in FIGURE 1, the ball cage 78 likewise moves to the left thereby allowing the balls 96 to move outwardly to the inclined face 98 on the end of the skirt 81 of the cage 78 thereby releasing the shaft 56 and collar 93 from a locked or cocked position to a tripped position as shown in FIGURE 2.

The top assembly 51 includes a spring housing 100 having a pressure spring 101 which engages the left end of the diaphragm nut 88 to provide a predetermined bias on the diaphragm 72. The force of the spring 101 against the diaphragm 72 may be adjusted by varying the position of a threaded spring seat member 103. Also, different strength springs may be employed. The seat member 103 and spring 101 are readily accessible by removal of the plug 105. The spring 101, or adjustment thereof, determines the pressure required on the right side of the diaphragm to trigger or release the latching mechanism to allow the valve closure unit 57 to engage the seat 21. A seal plug 105 is threaded into the end of the housing 101 and a gasket 106 provides a seal between the plug and housing. According to another feature of the invention, the plug 105 aids in providing sufficient force to initially move the valve closure unit 57 away from the seat 21. A groove 107 is provided in the plug 105 for freely receiving the left end 108 of the shaft 56 which has a washer 109 and retainer ring 110 thereon. Fingers 112 are provided on the plug 105 for engaging the washer 109 to facilitate resetting of the overpressure shutoff device to a reset position. A slot 113 is provided in the plug 105 for receiving the end of a screw driver, or the like, for facilitating rotation of the plug.

In the event of a predetermined overpressure condition in the outlet chamber 16 or at a location downstream thereof as sensed by the diaphragm 72 through the passageway 74 or a similar passageway connected to a downstream point, the pressure in the right hand side of the chamber 73 increases thereby causing the ball cage 78 to move to the left on the shaft 56. This action allows the balls 96 to move outwardly to the position shown in FIGURE 2 thereby releasing the collar 93 and allowing the seat disk unit 57 to move against the valve seat 21 under the force of the spring 70. This coaxial arrangement of the collar 93, shaft 56 and the ball cage 78 enables construction of a relatively compact overpressure shutoff device which is particularly useful with large pressure regulators. When the device is tripped, subsequent correction of the overpressure condition does not automatically cause the device to be reset or cocked, but this is done manually. This is a safety advantage since once an overpressure condition occurs a drop in the pressure does not cause the device to reset and allow passage of gas through the orifice 19 of the pressure regulator valve.

Inasmuch as the pressure in the inlet chamber 14 may be relatively high, such as one hundred and twenty-five pounds per square inch, it is sometimes difficult to reset the shutoff device because this pressure acts on the exterior of the seat disk unit 57 making it difficult to initially withdraw the unit away from the valve seat 21. Unscrewing the plug 105 causes the fingers 112 to engage the washer 109 on the end of the shaft 56 thereby essentially acting as a jack screw to facilitate movement of the unit 57 away from the valve seat 21. As the plug 105 is threadably withdrawn, it pulls the shaft 56 to the left as shown in the drawing thereby moving the seat disk unit 57 away from the valve seat 21, the force required to complete resetting of the device is substantially less, being essentially the force of the spring 101. The plug 105 then may be withdrawn from the housing 100 and pulled by hand, or the end of the shaft 56 pulled by a suitable tool, to complete the resetting operation.

The present embodiment of the invention is to be considered in all respects as illustrative and not restrictive, the scope of the invention being indicated by the appended claims rather than by the foregoing description, and all changes which come within the meaning and range of equivalency of the claims therefore are intended to be embraced therein.

What is claimed is:

1. An overpressure shutoff device for use with a pressure regulator for terminating gas flow through said regulator upon the occurrence of an overpressure condition comprising a housing having a diaphragm mounted therein responsive to an overpressure condition acting on said diaphragm in a first direction, said housing having a first end adapted to be coupled with a regulator, said housing having a bore through said end, valve means having a shaft extending through said bore and coupled with a valve closure unit exterior of said end of said housing, said valve means having a reset position and a tripped position and including biasing means normally biasing said closure unit in a second direction toward said tripped position, said shaft having shoulder means, latching means coupling said shaft to said diaphragm, said latching means normally maintaining said valve means in said reset position in the absence of an overpressure condition and allowing said valve means to move to a tripped position upon the occurrence of said overpressure condition, said latching means comprising cage means mounted coaxially on said shaft for relative movement with respect thereto and having a skirt portion defining a space between said skirt portion and said valve shaft, and a plurality of balls mounted in said space and abutting said shoulder means on said shaft for retaining said valve means in said reset position, and plug means threaded on another end of said housing for engaging a second end of said shaft for causing said valve means to be moved toward said reset position as said plug means is unscrewed.

2. A device as in claim 1 including plug means threaded on another end of said housing for engaging a second end of said shaft for causing said valve means to be moved toward said reset position as said plug means is unscrewed.

3. A device as in claim 1 wherein said second end of said shaft includes second shoulder means thereon and said plug means includes finger means thereon for engaging said second shoulder means.

4. A device as in claim 1 wherein said skirt portion of said cage means normally abuts the interior of said first end of said housing for retaining said balls in said space but allowing said balls to move away from said shoulder means when said diaphragm moves said cage means as a result of said overpressure condition.

5. In a pressure regulator having an inlet adapted to be coupled with a supply line, an outlet at which pressure is to be regulated, and a controlled orifice between said inlet and outlet, an overpressure device responsive to an overpressure condition for closing said orifice comprising a housing defining a diaphragm chamber and having a diaphragm therein responsive to an overpressure condition acting on said diaphragm in a first direction, biasing means in said housing normally biasing said diaphragm in a second direction, said housing having a first end adapted to be coupled with a regulator having a valve orifice, and said housing having a bore through said end, valve means having a shaft extending through said bore and coupled with a valve closure unit exterior of said end of said housing and adapted to close said orifice when moved in a second direction from a first to a second position, said valve means including biasing means normally biasing said closure unit in said second direction toward said second position, said shaft having shoulder means, latching means coupled with said diaphragm for normally maintaining said valve means in said first position in the absence of an overpressure condition and allowing said valve means to move to said second position upon the occurrence of said overpressure condition, said latching means comprising cup means mounted coaxially on said valve shaft for relative movement with respect thereto and having a skirt portion normally adjacent the interior of said end of said housing and defining a space between said skirt portion and said valve shaft, a plurality of balls mounted in said space between said shoulder means on said shaft and said interior end of said housing for retaining said valve means in said first position, and plug means threaded on said housing for engaging a second end of said shaft for causing said valve means to be moved toward said first position as said plug means is unscrewed.

6. A device as in claim 5 including plug means threaded on said housing for engaging a second end of said shaft for causing said valve means to be moved toward said first position as said plug means is unscrewed.

7. An overpressure shutoff device for use with a pressure regulator for terminating gas flow through said regulator upon the occurrence of an overpressure condition comprising a housing having a diaphrgam mounted therein responsive to an overpressure condition, said housing having a first end adapted to be coupled with a regulator, said housing having a bore through said end, valve means having a shaft extending through said bore and coupled with a valve closure unit exterior of said end of said housing, said valve means having a reset position and a tripped position and including biasing means normally biasing said closure unit to said tripped position, said shaft having shoulder means, latching means coupling said shaft to said diaphragm, said latching means normally maintaining said valve means in said reset postion in the absence of an overpressure condition and allowing said valve means to move in one direction to a tripped position upon the occurrance of said overpressure condition acting on said diaphragm in an opposite direction, said latching means comprising cage means mounted coaxially on said shaft for relative movement with respect thereto, said cage means including a ball receiving space between said cage and said valve shaft, a plurality of balls mounted in said ball receiving space and abutting said shoulder means on said shaft for retaining said valve means in said reset position, and plug means threaded on another end of said housing for engaging a second end of said shaft for causing said valve means to be moved toward said reset position as said plug means is unscrewed.

8. A device as in claim 7 including plug means threaded on another end of said housing for engaging a second end of said shaft for causing said valve means to be moved toward said reset position as said plug means is unscrewed.

9. A pressure regulator having a valve body defining an inlet adapted to be coupled with a supply line and an outlet at which pressure is to be regulated, an orifice member between said inlet and outlet, and a valve closure member adapted to restrict a first end of said orifice for controlling said outlet pressure, an overpressure device having a housing with a diaphragm therein responsive to an overpressure condition, said housing having an end coupled with said valve body, and said housing having a bore through said end, valve means having a shaft extending through said bore with a first end of said shaft coupled with a valve closure unit exterior of said end of said housing and adapted to close a second end of said orifice member when moved from a first to a second position, said valve means including biasing means normally biasing said closure unit to said second position, said shaft having shoulder means, latching means coupling said shaft to said diaphragm, said latching means normally maintaining said valve means in said first position in the absence of an overpressure condition and allowing said valve means to move to said second position upon the occurrence of said overpressure condition to close the second end of said orifice member, said latching means comprising cage means mounted coaxially on said valve shaft for relative movement with respect thereto, said cage means having a ball receiving space between said cage means and said valve shaft, a plurality of balls mounted in said space and abutting said shoulder means on said shaft for retaining said valve means in said reset position, said cage means allowing said balls to move away from said shoulder means when said diaphragm moves said cage means as a result of said overpressure condition, and plug means threaded on another end of said housing for engaging a second end of said shaft for causing said valve means to be moved toward said first position as said plug means is unscrewed.

10. A regulator as in claim 9 including plug means threaded on another end of said housing for engaging a second end of said shaft for causing said valve means to be moved toward said first position as said plug means is unscrewed.

11. An overpressure shutoff device for use in terminating fluid flow upon the occurrence of an overpressure condition comprising a housing having a diaphragm mounted therein responsive to an overpressure condition acting on said diaphragm in a first direction, said housing having a first end with a bore therethrough, valve means having a shaft extending through said bore and coupled with a valve closure unit exterior of said end of said housing, said valve closure unit cooperating with an orifice through which said fluid may flow, said valve means having a reset position and a tripped position and including biasing means normally biasing said closure unit in a second direction toward said tripped position, said shaft having shoulder means, latching means coupling said shaft to said diaphragm, said latching means normally maintaining said valve means in said reset position in the absence of an overpressure condition for allowing fluid flow through said orifice and allowing said valve means to move to a tripped position upon the occurrence of said overpressure condition for terminating fluid flow through said orifice, said latching means comprising cage means mounted coaxially on said shaft for relative movement with respect thereto and having a skirt portion defining a space between said skirt portion and said valve shaft, and a plurality of balls mounted in said space and abutting said shoulder means on said shaft for retaining said valve means in said reset position, and plug means threaded on another end of said housing for engaging a second end of said shaft for causing said valve means to be moved toward said reset position as said plug means is unscrewed.

12. A device as in claim 11 wherein said second end of said shaft includes second shoulder means thereon and said plug means includes finger means thereon for engaging said second shoulder means.

References Cited

UNITED STATES PATENTS

| | | | |
|---|---|---|---|
| 2,940,468 | 6/1960 | Drabik | 137—461 |
| 3,228,417 | 1/1966 | Schwerter | 137—461 |

FOREIGN PATENTS 501,595 7/1930 Germany.

HAROLD W. WEAKLEY, *Primary Examiner.*

U.S. Cl. X.R.

137—463, 505.46; 251—73